No. 898,214. PATENTED SEPT. 8, 1908.
E. E. GOLD.
AUTOMATIC PIPE COUPLING FOR RAILWAY CARS.
APPLICATION FILED NOV. 27, 1903.
FIG. 1.
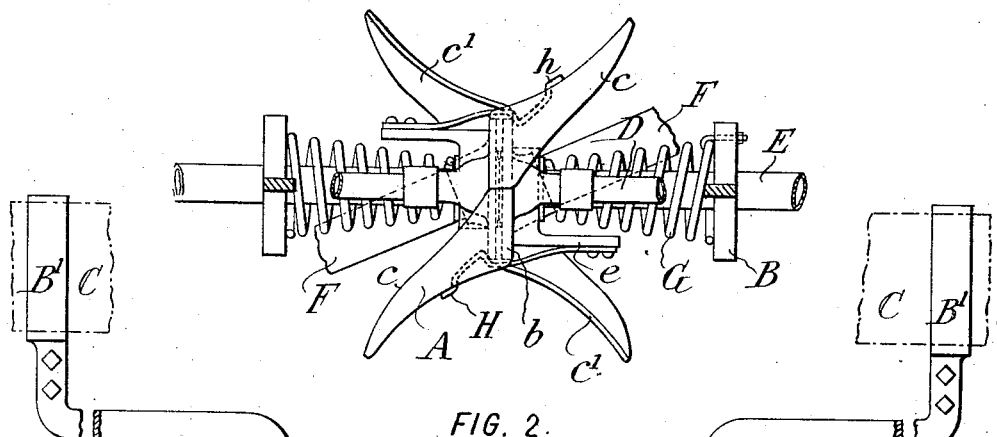
FIG. 2.
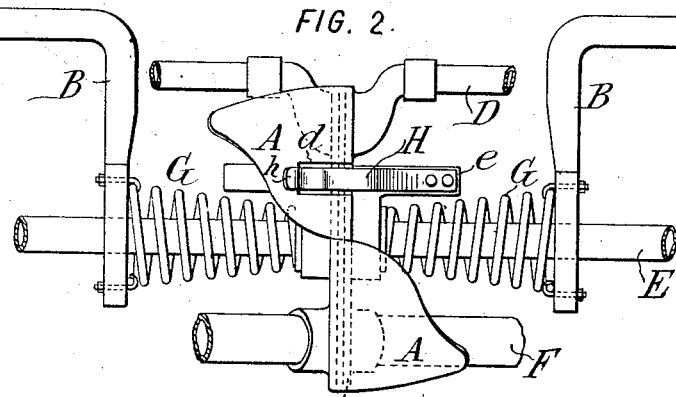
FIG. 3.
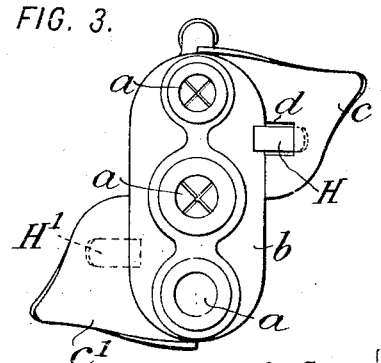
FIG. 4.
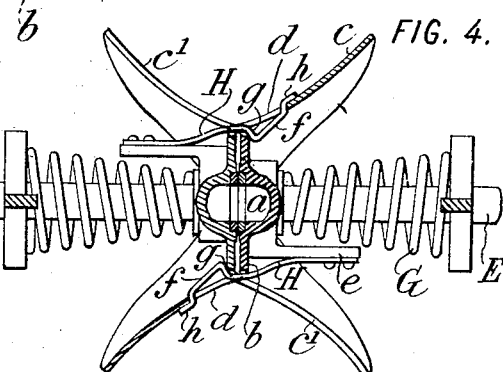
FIG. 5. FIG. 6.
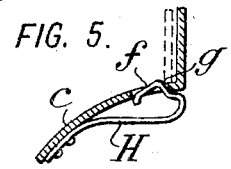
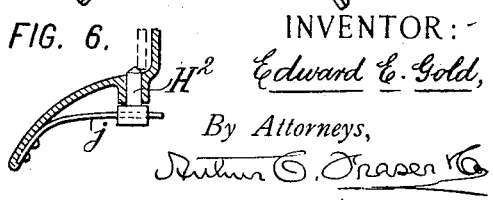
WITNESSES:
Fred White
René Pruine
INVENTOR:
Edward E. Gold,
By Attorneys,
Arthur E. Fraser

UNITED STATES PATENT OFFICE.

EDWARD E. GOLD, OF NEW YORK, N. Y.

AUTOMATIC PIPE-COUPLING FOR RAILWAY-CARS.

No. 898,214.   Specification of Letters Patent.   Patented Sept. 8, 1908.

Application filed November 27, 1903. Serial No. 182,934.

*To all whom it may concern:*

Be it known that I, EDWARD E. GOLD, a citizen of the United States, and residing in the borough of Manhattan, city, county, and State of New York, have invented certain new and useful Improvements in Automatic Pipe-Couplings for Railway-Cars, of which the following is a specification.

This invention relates to that class of pipe couplings used for uniting steam-heating, air brake or signal pipes, or any two or all of these on railway cars, wherein the respective heads of the coupling engage automatically as the cars are brought together. To this end it is customary in such couplings to connect the coupling heads mechanically to the car coupler or the draw bars thereof, in order that as the car couplers come together the pipe couplers shall be presented in correct relation for automatic engagement. Such pipe couplers as heretofore constructed are found to operate satisfactorily under normal conditions, but are subject to the serious disadvantage that in rounding very sharp curves, and particularly on reverse curves, the coupling heads open out or unfold laterally by rocking or tilting the one upon the other, thereby permitting an escape of the compressed fluid, which deranges the normal operation of the air brake or signal systems, and, in the case of the steam-heating pipe, permits an escape of steam, which is liable to scald persons standing alongside the track. My invention aims to overcome this disadvantage of such automatic pipe couplers.

According to my invention I add to the normal or existing coupling devices a spring latch or lock on one coupling head having beveled faces adapted as the coupling heads come together to slide into engagement with the opposite coupling head, and preferably so beveled that as the couplers are drawn apart in parting the cars, the latch shall yield and release its hold upon the opposite head. Preferably for symmetry and for the better interlocking of the respective heads I provide each with a latch on one side, so that as the heads come together their respective latches engage on opposite sides of the respective heads. The latches are made with sufficiently stiff springs and a sufficiently acute bevel to enable them to hold the coupling heads firmly together in rounding the sharpest curves that are found in practice. On the other hand the strength is insufficient to hold the coupling heads together during the act of uncoupling.

I will proceed to describe the application of my invention to an example of automatic pipe coupling, the coupling selected for this purpose being of a known type.

Figure 1 of the accompanying drawings is a plan showing a pair of couplers provided with my invention in the coupled position. Fig. 2 is a side elevation thereof. Fig. 3 is a front or end elevation of one of the coupling heads. Fig. 4 is a fragmentary horizontal section. Figs. 5 and 6 are fragmentary horizontal sections showing part of Fig. 4 modified.

Referring to the drawings let A A designate the respective coupling heads of any suitable or known construction, and let B B designate the usual or any suitable supports connecting them to the car couplers or draw bars in the well known manner. Although this connection is well understood I have in Fig. 2 shown the support B as provided with its clamp B' surrounding the draw bar, the latter being shown in dotted lines at C. The coupler shown is provided with three seats $a\ a\ a$, Fig. 3, communicating respectively with three pipes D E F, which may be the signal, brake and steam-heating pipes respectively. These pipes are connected through any suitable flexible or articulated connection with the corresponding pipes on the respective cars in the well known manner. The middle pipe E serves as a guide and connection between the support B and the coupling head A. In the particular coupling shown the coupling heads A are made each with a flat front plate $b$ and with two diagonally opposite outwardly-flaring wings $c\ c'$, the wing $c$ occupying the upper and right-hand quarter and the wing $c'$ occupying the lower and left-hand quarter of the coupling, so that when the opposite head approaches, its wing $c$ will fill the upper and left-hand space and its wing $c'$ will fill the lower and right-hand space, as will be apparent from Fig. 3. The wings $c\ c'$ serve as guides as the coupling heads come together, being beveled on their edges so that as they engage one another they will force the heads to enter into correct relations, as shown in Figs. 1 and 2. The heads are pressed forward by heavy springs G G which react against the supports B. The parts are so proportioned that as the cars come together the pipe couplers engage in advance of the car couplers, their seating faces coming into abutment when the respective car couplers have interengaged far enough to insure their correct alinement, and thereby, through the supports B B, to cause the pipe coupling heads to approach in substantial alinement with one another. During the remaining movement and while the car couplers are locking together the approach of the supports B B serves to compress the springs G G, which thereby serve to hold the heads A A pressed strongly together.

As thus far described the construction is that of an already known automatic coupler, and is selected for the purpose of illustrating my present invention as being typical of a class of automatic couplers wherein the seats communicating with the respective pipes are held in engagement by the pressure of heavy springs. Heretofore these springs have been relied upon to hold the seats in sufficiently tight engagement to prevent their opening out under the pressure of the confined fluids. They have been adequate for this purpose under normal conditions, that is, in running on straight tracks and in rounding curves of large radius; but on curves of short radius and on reverse curves the lateral stress or tendency to pry open the heads has caused them to open at one side by tilting one on the other, and it has been found impracticable to make the springs G or other means for forcing the heads together sufficiently strong to prevent this result. I will now proceed to describe the application of my invention for overcoming this defect. I apply a spring latch or latches H, preferably one to each coupling head as shown, so that each latch will engage some suitable part or surface on the reciprocal head, in order that the two latches shall exert a strong tendency to hold the heads locked together at opposite sides. Preferably the upper wing $c$ of each head is formed with a slot $d$ through which the spring latch H works.

Preferably the latch H is made in the form of a leaf spring mounted upon a rearwardly extending arm or bracket $e$ which is fixed to or made integral with the coupling head; from its attachment to this arm the spring projects forward and enters the notch $d$, its front portion being shaped with two inclined faces $f$ and $g$. The face $f$ forms an inclined plane by which as the coupling heads come together the latch is forced outwardly in order that the side of the opposite head may be caught by it. The incline $g$ is the active or engaging face of the latch. This face may be made more or less abrupt depending upon the stiffness of the spring, the fluid pressure to be overcome, and the sharpness of the curves to be provided against. If this face is made too abrupt proper separation of the couplings as the cars draw apart may be defeated. The end $h$ of the spring may be extended beyond the notch $d$ to form a stop by abutting against the outer face of the wing $c$. As the coupling heads come together one side of each head presses against the face $f$ of the latch on the opposite head, thereby pressing the two latches outwardly until, as the heads come into abutment, the inclined face $g$ of each latch enters partly behind the front plate of the opposite head, whereby the two heads are bound tightly together on opposite sides of the respective seats $a$ $a$. So firm is this connection that it will resist a very considerable lateral or tilting stress such as tends to pry the heads apart and permit escape of fluid pressure at the side.

The latches may be duplicated by providing the wings $c'$ each with a latch as shown in dotted lines at H', Fig. 3, thereby making four latches to the complete coupling; but ordinarily two will suffice.

In Fig. 5 is shown a modification of the latch, which is formed of a leaf spring bent upon itself as shown and fastened to the outer part of the wing $c$, thereby dispensing with the rearward supporting arm $e$. The inclines $f$ and $g$ are unchanged.

My invention may be greatly modified in the shape and mounting of the latch and in its mechanical construction. For example in Fig. 6 the latch is shown as a sliding bolt $H^2$ pressed inward by a leaf spring $j$.

My invention is applicable to a great variety of constructions of automatic couplers and is not limited to its application to the particular construction shown.

I claim as my invention:

1. An automatic pipe coupling for railway cars, comprising reciprocal heads having inter-engaging projections and means for forcing them together, combined with a spring latch on each head independent of such forcing means having beveled faces adapted to engage the side of the opposite head and to resist but not prevent the prying apart of the heads by lateral stress.

2. An automatic pipe coupling for railway cars, comprising reciprocal heads having flaring wings for engaging one another as they come together, combined with a spring latch carried by one head comprising a leaf spring formed with engaging faces projecting through an opening in one of said wings and adapted to engage the opposite head.

3. An automatic pipe coupling for railway cars comprising reciprocal heads having meeting faces in a plane transverse to the length of the cars, said heads having interengaging projections for alining them as they come together, springs for forcing them together, and a spring latch on each head adapted to engage the opposite head and to resist but not prevent the prying apart of the heads by lateral stress.

4. An automatic pipe coupling for railway cars, comprising reciprocal heads having flaring wings for engaging one another as they come together, combined with a spring latch carried by one head comprising a leaf spring formed with beveled faces adapted to engage the side of the opposite head, and to resist but not prevent the prying apart of the heads by lateral stress.

5. An automatic pipe coupling for railway cars comprising reciprocal heads having meeting faces in a plane transverse to the length of the cars, said heads having interengaging projections for alining them as they come together, springs for forcing them together, and a spring latch on each head adapted to engage the opposite head and to resist but not prevent the prying apart of the heads by lateral stress, each latch consisting of a leaf spring fixedly united to its head, and having a beveled face engaging the opposite head.

In witness whereof, I have hereunto signed my name in the presence of two subscribing witnesses.

EDWARD E. GOLD.

Witnesses:
  THEODORE T. SNELL.
  FRED WHITE.